United States Patent
Bellio

(10) Patent No.: US 12,194,406 B2
(45) Date of Patent: Jan. 14, 2025

(54) DEVICE FOR PURIFYING A PROCESS FLUID AND DEHUMIDIFYING PLANT INCLUDING SUCH A DEVICE

(71) Applicant: PIOVAN S.p.A., Santa Maria di Sala (IT)

(72) Inventor: Enrico Bellio, Ponzano Veneto (IT)

(73) Assignee: PIOVAN S.p.A., Santa Maria di Sala (IT)

( * ) Notice: Subject to any disclaimer, the term of this patent is extended or adjusted under 35 U.S.C. 154(b) by 625 days.

(21) Appl. No.: 17/414,479

(22) PCT Filed: Dec. 13, 2019

(86) PCT No.: PCT/IB2019/060762
§ 371 (c)(1),
(2) Date: Jun. 16, 2021

(87) PCT Pub. No.: WO2020/128746
PCT Pub. Date: Jun. 25, 2020

(65) Prior Publication Data
US 2022/0054971 A1  Feb. 24, 2022

(30) Foreign Application Priority Data
Dec. 21, 2018  (IT) .......... 102018000020689

(51) Int. Cl.
*B01D 53/04* (2006.01)
*B29B 9/16* (2006.01)
*F26B 25/00* (2006.01)

(52) U.S. Cl.
CPC ..... *B01D 53/0431* (2013.01); *B01D 53/0446* (2013.01); *B29B 9/16* (2013.01);
(Continued)

(58) Field of Classification Search
CPC .......... B01D 53/0431; B01D 53/0446; B01D 2253/102; B01D 2253/25; B01D 2253/34;
(Continued)

(56) References Cited

U.S. PATENT DOCUMENTS

| 1,429,856 A | * | 9/1922 | Etter | B01D 53/0431 208/341 |
| 2,622,414 A | * | 12/1952 | Jaubert | B01D 53/0431 62/93 |

(Continued)

FOREIGN PATENT DOCUMENTS

| AU | 2009202479 A1 | 10/2009 | |
| WO | WO-2023247482 A1 | * 12/2023 | ......... B01D 53/0407 |

OTHER PUBLICATIONS

International Search Report and Written Opinion of the International Searching Authority; Application No. PCT/IB2019/060762; Completed: Feb. 26, 2020; Mailing Date: Mar. 4, 2020; 10 Pages.

*Primary Examiner* — Stephen Hobson
(74) *Attorney, Agent, or Firm* — Whitmyer IP Group LLC

(57) ABSTRACT

A purifying device for purifying a process fluid that flows in a dehumidifying plant for dehumidifying plastics includes a first layer configured for filtering the process fluid, and a second layer configured for reducing, by adsorption, substances that are harmful for health, in particular COV/SOV, which are present in the process fluid.

15 Claims, 7 Drawing Sheets

(52) U.S. Cl.
CPC .......... *F26B 25/006* (2013.01); *F26B 25/007* (2013.01); *B01D 2253/102* (2013.01); *B01D 2253/25* (2013.01); *B01D 2253/34* (2013.01); *B01D 2257/7027* (2013.01); *B01D 2257/708* (2013.01); *B01D 2259/40084* (2013.01); *B29B 2009/168* (2013.01); *F26B 2200/08* (2013.01)

(58) Field of Classification Search
CPC ...... B01D 2257/7027; B01D 2257/708; B01D 2259/40084; B01D 53/0407; B29B 9/16; B29B 2009/168; F26B 25/006; F26B 25/007; F26B 2200/08
See application file for complete search history.

(56) References Cited

U.S. PATENT DOCUMENTS

| | | | | |
|---|---|---|---|---|
| 2,801,706 | A * | 8/1957 | Gunnar | B01D 53/26 95/123 |
| 4,559,066 | A * | 12/1985 | Hunter | B01D 46/64 55/498 |
| 5,120,331 | A * | 6/1992 | Landy | B01D 53/0415 96/135 |
| 5,139,542 | A * | 8/1992 | Sowinski | B01D 53/0446 95/147 |
| 5,145,494 | A * | 9/1992 | Sowinski | B01D 39/16 96/108 |
| 5,288,469 | A * | 2/1994 | Skalla | B01D 46/0036 261/DIG. 26 |
| 5,354,362 | A * | 10/1994 | Sowinski | B01D 53/0431 95/287 |
| 5,807,422 | A * | 9/1998 | Grgich | B01D 53/0454 96/111 |
| 6,097,011 | A * | 8/2000 | Gadkaree | B01J 20/28042 428/116 |
| 6,274,041 | B1 * | 8/2001 | Williamson | B01D 53/0431 210/243 |
| 8,877,107 | B2 * | 11/2014 | Hanimann | B29B 13/065 264/142 |
| 12,076,687 | B2 * | 9/2024 | Greenbank | B01J 20/2804 |
| 2003/0096152 | A1 * | 5/2003 | Traver | H01M 8/0662 429/410 |
| 2005/0235615 | A1 * | 10/2005 | Nyman | B01D 53/0431 55/350.1 |
| 2006/0249019 | A1 * | 11/2006 | Roychoudhury | B01D 53/0431 95/90 |
| 2008/0028933 | A1 * | 2/2008 | Ross | B01D 53/0415 96/108 |
| 2008/0047436 | A1 * | 2/2008 | Baker | B01D 53/06 96/125 |
| 2012/0222555 | A1 * | 9/2012 | Gupta | B01J 20/28057 502/79 |
| 2013/0068101 | A1 * | 3/2013 | Knapp | B01J 20/305 156/244.11 |
| 2013/0152787 | A1 * | 6/2013 | Boulet | B01D 53/0462 95/91 |
| 2013/0269524 | A1 * | 10/2013 | Monereau | B01D 53/0462 502/67 |
| 2014/0013955 | A1 * | 1/2014 | Tammera | B01J 20/3204 156/305 |
| 2015/0174520 | A1 * | 6/2015 | Monereau | B01J 20/28045 96/154 |
| 2015/0328962 | A1 * | 11/2015 | Felber | B01D 46/2474 95/286 |
| 2015/0343418 | A1 * | 12/2015 | Johnson | B01D 46/2482 502/410 |
| 2016/0096137 | A1 * | 4/2016 | House | B01J 20/3234 95/134 |
| 2016/0361681 | A1 * | 12/2016 | Pedace | F24F 3/1411 |
| 2017/0173515 | A1 * | 6/2017 | Gesbert | B01D 53/0462 |
| 2017/0216760 | A1 * | 8/2017 | Le Bot | C01B 13/0266 |
| 2017/0304768 | A1 * | 10/2017 | Weagle | B01D 53/0431 |
| 2018/0117527 | A1 * | 5/2018 | Tohoda | B01D 53/0431 |

\* cited by examiner

DEVICE FOR PURIFYING A PROCESS FLUID AND DEHUMIDIFYING PLANT INCLUDING SUCH A DEVICE

TECHNICAL FIELD

The invention relates to a purifying device for purifying a process fluid and a dehumidifying plant including such a device.

BACKGROUND

In particular, the invention refers to a purifying device associable with a dehumidifying plant for dehumidifying plastics in granular and/or microgranular and/or powder and/or flake or similar form.

Plants are known for dehumidifying plastics intended for supplying user machines, in particular machines for treating and transforming plastics, such as machines for extruding, and subsequently injection and/or blow and/or compression moulding such plastics.

More precisely, known dehumidifying plants are associated with at least one user machine, for example an injection press, and are configured for thermally conditioning, i.e., dehumidifying, by a process fluid, the plastics, before the plastics are supplied to the at least one user machine.

The process fluid, typically air, for dehumidifying the plastics suitably before they supply the at least one user machine, is appropriately conditioned thermally, for example heated and/or dried, and forced to contact directly a mass of plastics housed in a hopper.

Also, known dehumidifying plants are provided with filtering devices, made of paper or fabric, for filtering the powder present in the and/or produced by the plastics, so as to prevent mechanical members present in the dehumidifying plant getting damaged.

One of the drawbacks of the known filtering devices included in the dehumidifying plants quoted above is that they are not able to adsorb the substances released by the plastics.

In fact, during the dehumidifying process disclosed above, it may happen that following heating of the plastics by the process fluid, plastics may release into the environment substances such as "volatile organic compounds" (known hereinafter for the sake of brevity as COVs) and/or "volatile organic solvents" (known hereinafter for the sake of brevity as SOVs) comprising different chemical compounds formed by molecules provided with different functional units, having different physical and chemical behaviours, but characterized by a certain volatility, which is characteristic for example, of the common organic solvents.

In particular, the COVs and/or SOVs can be released from the plastics by breakage of the molecular chains, both following the aforesaid heating during the dehumidifying process and because of a pressing action on the single granules by the mass of surrounding plastics, and/or a vapour tension difference between the process fluid, which is very dry and thus greedy for water, and the wet mass of plastics, and, to a lesser extent, depending on the type of production and/or chemical composition, and/or the presence of additives and/or the origin, of the plastics.

Examples of COVs are benzene, toluene, limonene; examples of SOVs are aldehyde, ketones, esters, alcohol, and nitroderivates.

Also, COV/SOV emissions are becoming particularly critical in the sector of plastic moulding in particular because of the use of increasingly higher percentages of recycled material in addition to the virgin material.

This criticality is felt particularly in the production of coverings and containers for food packaging where, for obvious reasons of sustainability, recycled material is very requested in order to reduce the need to resort to the production of virgin material, i.e., material arising from the products of petroleum distillation, and where it is possible that the COVs/SOVs will come into contact with the packaged product. Examples of food packaging are the preforms for bottles for packaging liquids, and multilayer films for packaging foodstuffs.

For this reason, the COVs/SOVs are kept under control and monitored by the competent bodies in order to regulate the percentage thereof present in the packaging.

SUMMARY

An object of the present invention is to provide a purifying device associable with a dehumidifying plant that is free of the drawback disclosed above.

This object and still others are achieved by a purifying device that is includible in a dehumidifying plant as disclosed in one or more of the claims set out below.

BRIEF DESCRIPTION OF THE DRAWINGS

The invention can be better understood and implemented with reference to the attached drawings that illustrate some embodiments thereof by way of non-limiting example, in which.

DETAILED DESCRIPTION

Figure 1:
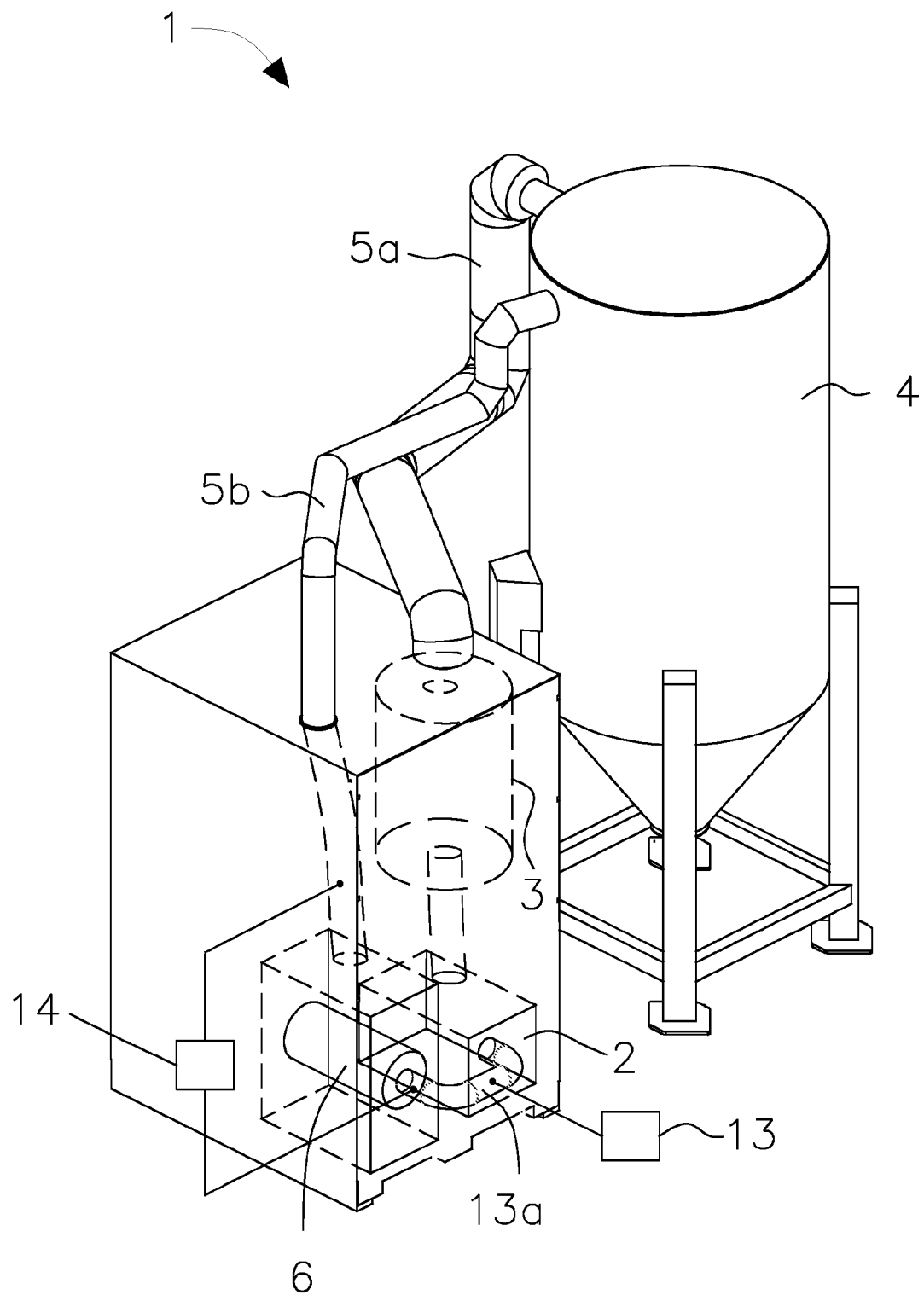
FIG. 1 is a schematic axonometric view of a dehumidifying plant including a purifying device for purifying a process fluid according to the invention.

With reference to FIG. 1, a dehumidifying plant 1 is shown, in particular a dehumidifying plant for dehumidifying plastics, which are not shown, in granular and/or microgranular and/or powder and/or flake or similar form, intended to supply one or more user machines, which are not shown, in particular machines for treating and transforming plastics, such as machines for extruding, and subsequently injection and/or blow and/or compression moulding, such plastics.

The dehumidifying plant 1 comprises a process fluid, for example air, generator 2, configured for generating a flow of process fluid. The process fluid generator 2 comprises, for example, a side channel blower or a fan.

The dehumidifying plant 1 further comprises a dehumidifier 3, for example of the dehumidifier tower type, or of the continuous regeneration type, or of the dehumidifier wheel type, or of the refrigerator cycle type, configured for thermally conditioning, in particular dehumidifying, the process fluid flow exiting the process fluid generator 2.

Also, the dehumidifying plant 1 includes a process fluid user 4 using process fluid thermally conditioned by the dehumidifier 3, the user 4 comprising, for example, a dehumidifying hopper intended to supply one or more user machines that is/are not shown.

The process fluid generator 2, the dehumidifier 3 and the user 4 are in fluid communication with one another by a first conduit 5a and a second conduit 5b that are included in the dehumidifying plant 1. In particular, the first conduit 5a conveys the process fluid entering the user 4, whilst the second conduit 5b conveys the process fluid exiting the user 4.

Also, the dehumidifying plant 1 comprises a purifying device 6 for purifying the process fluid exiting the process fluid user 4.

Figure 2:
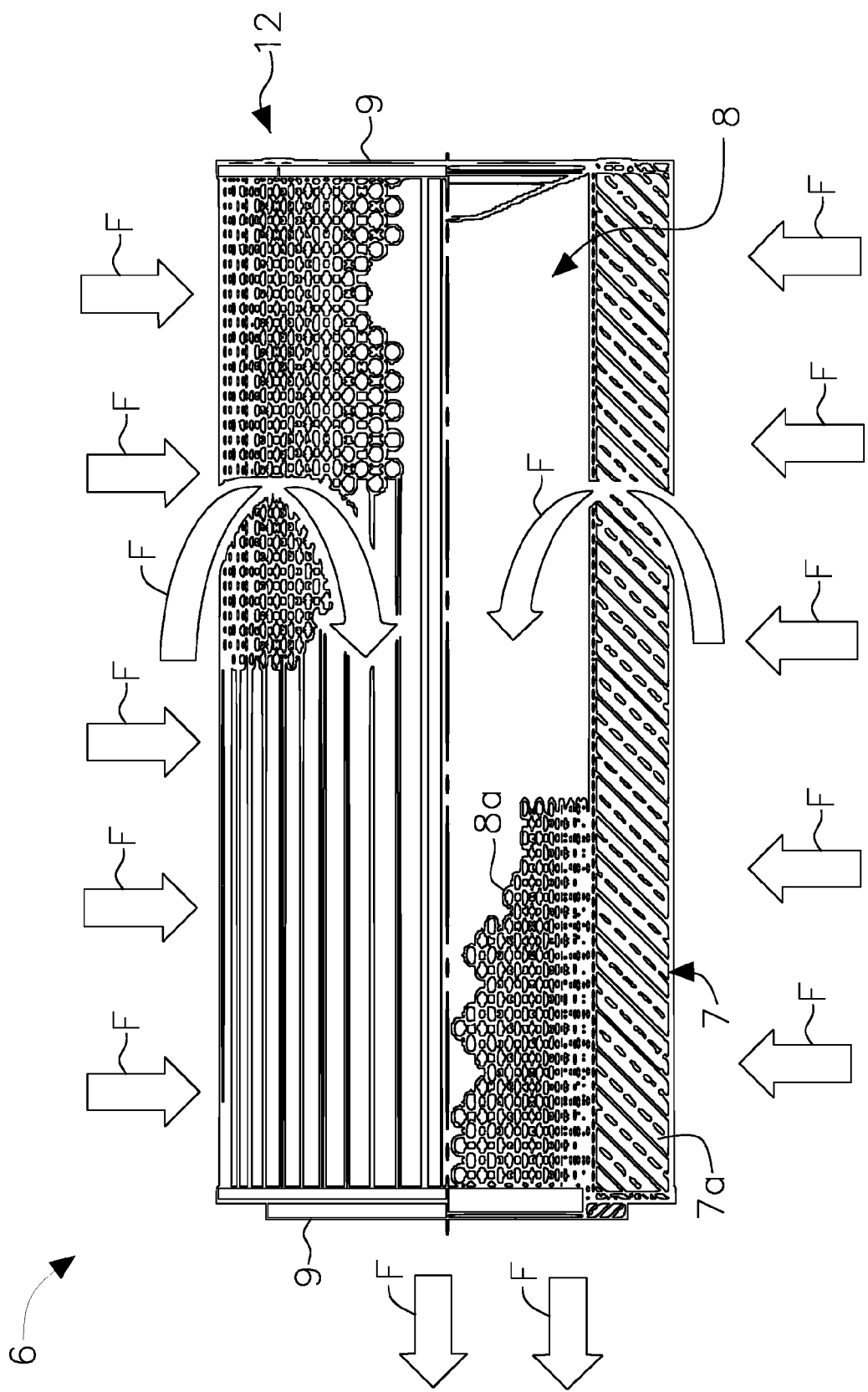
FIG. 2 is a partially sectioned schematic lateral view of the purifying device of FIG. 1.
Figure 3:
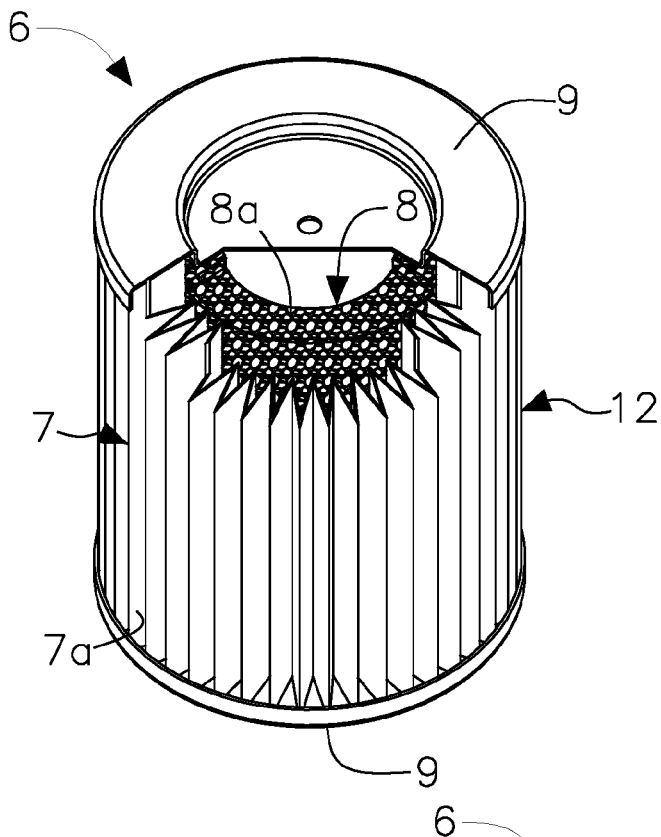
FIG. 3 is a partially sectioned schematic axonometric view of the purifying device of FIG. 1 in a first configuration.
Figure 10:
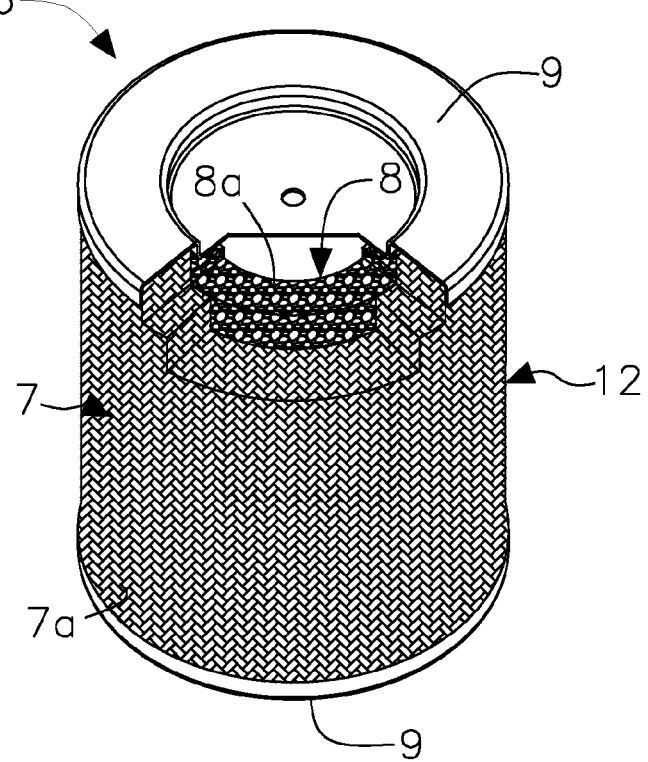
FIG. 10 is a view like that of FIG. 3 of a version of the purifying device 1 of FIG. 3.
Figure 4:
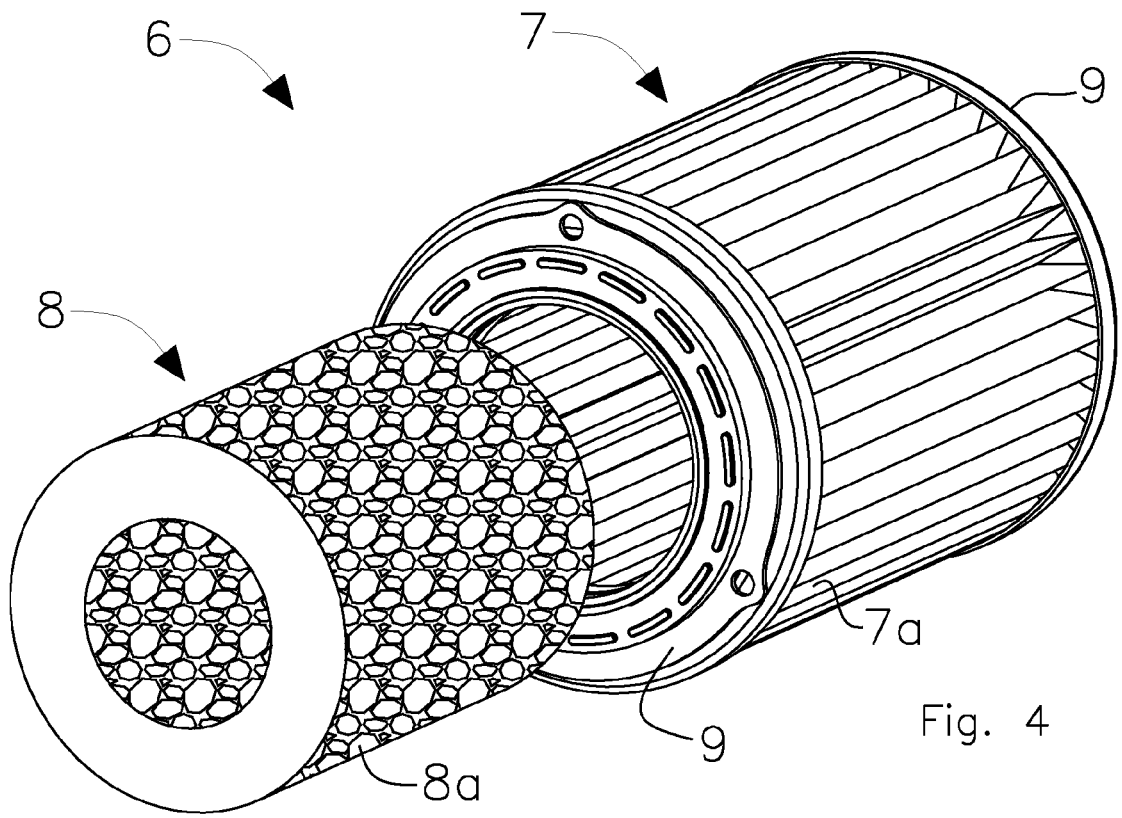
FIG. 4 is a schematic axonometric view of the purifying device of FIG. 1 in the first configuration.
Figure 5:
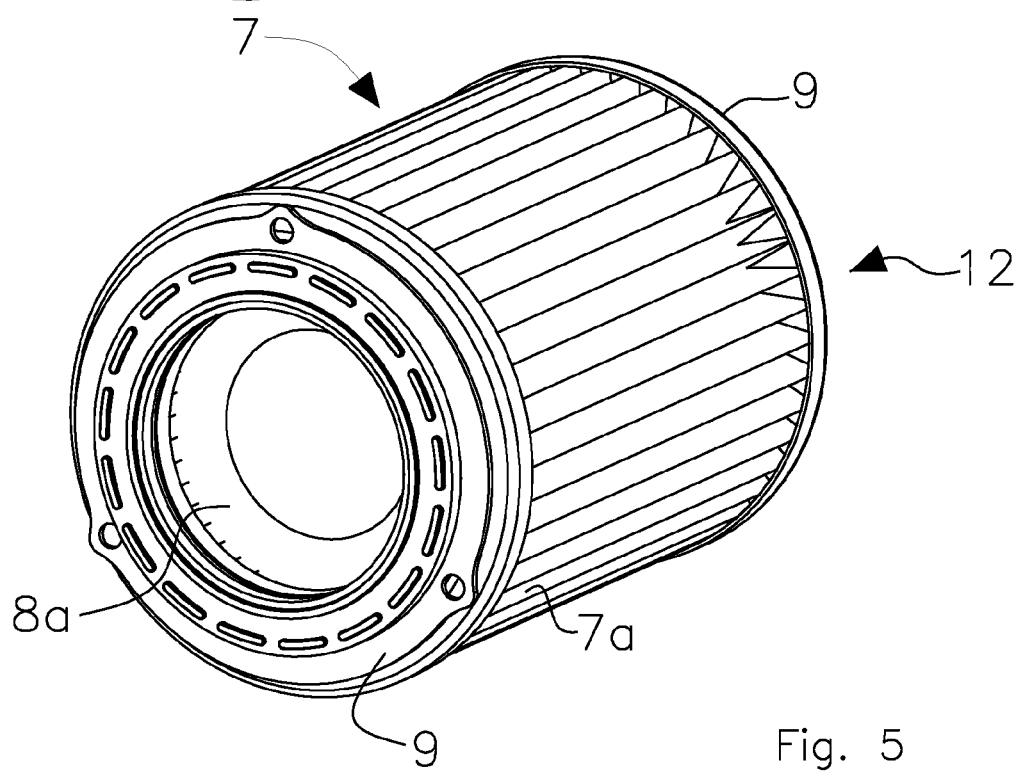
FIG. 5 is an exploded schematic axonometric view of the purifying device of FIG. 4.
Figure 6:
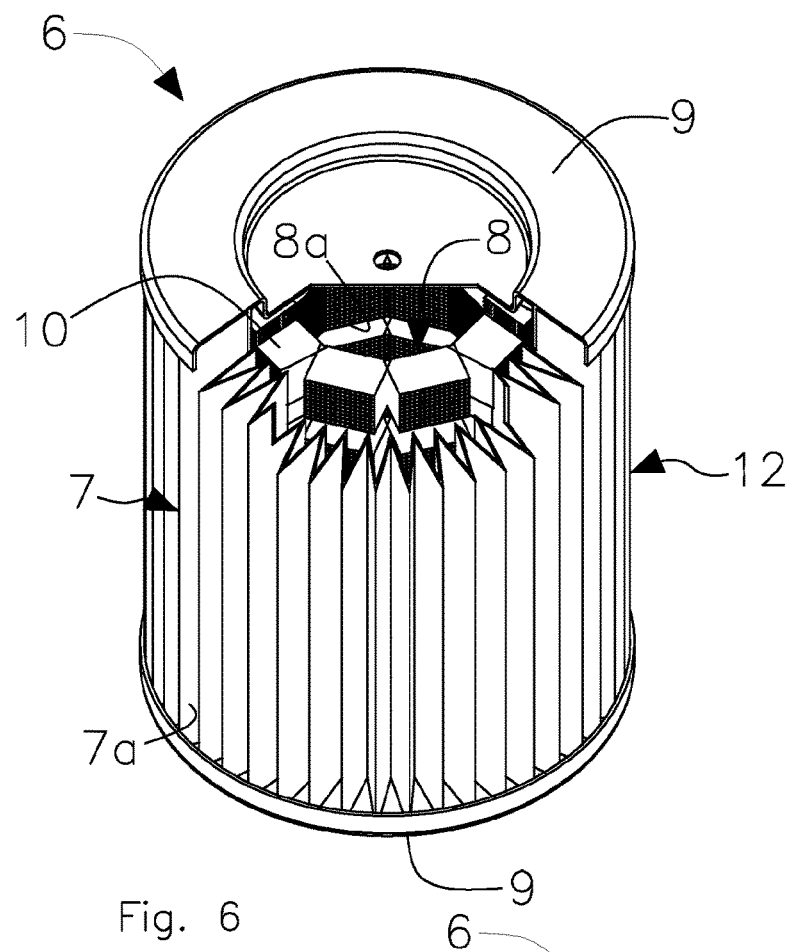
FIG. 6 is a view like that of FIG. 3 of the purifying device of FIG. 1 in a second configuration.
Figure 11:
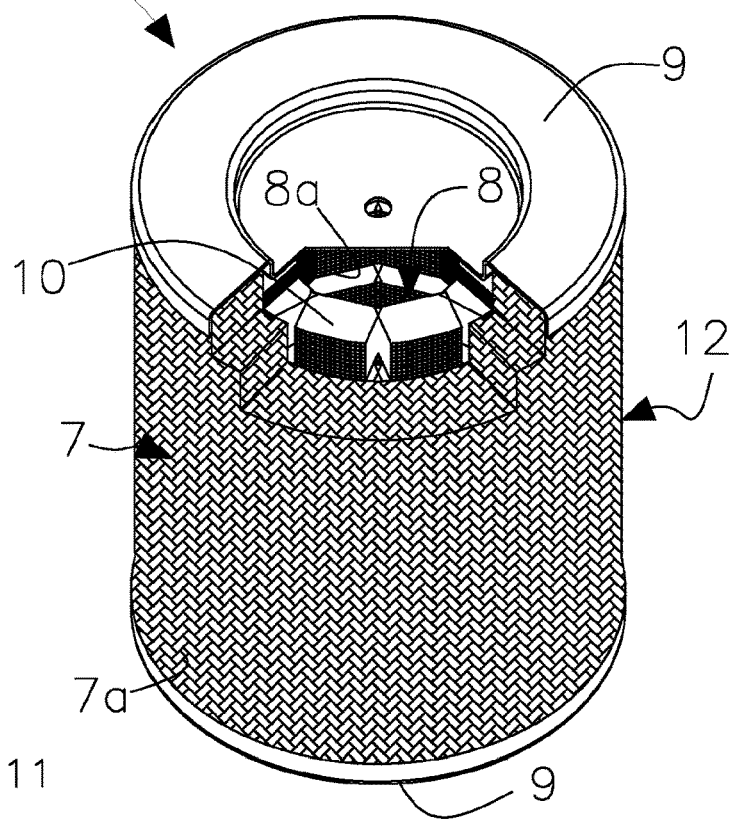
FIG. 11 is a view like that of FIG. 3 of a version of the purifying device 1 of FIG. 6.

The purifying device 6, illustrated in FIG. 2, has a symmetric axial shape, with a dimension that is predominant with respect to the others, in particular it has a cylindrical shape. In use, the process fluid flow to be purified enters radially the purifying device 6 to then exit therefrom, purified, axially, according to the direction of the arrows F shown.

The purifying device 6, as illustrated in FIGS. 2-6 and 8-11, comprises a body 12 including a more external first layer 7, and a more internal second layer 8, and a seal arrangement 9, for example rubber washers or seals, positioned between the various parts that make up the purifying device 6 to reduce losses to the purifying capacity of the device. In particular, the first layer 7 must be considered to be more external than the second layer 8 with respect to an advancement direction of the flow of the process fluid.

The first layer 7 is made of filtering material 7a, for example paper (FIGS. 2-6, 8-9), and/or polyester (FIGS. 10 and 11), and/or microfibres, and/or the like, for example with porosity of 8, or 10, or 20 microns, and is configured for retaining solid particles, "powder", having dimensions greater than its own porosity. The choice of the type of filtering material 7a depends on the nature of the powder, on the dimensions thereof, on the operating temperature of the dehumidifying plant 1, etc.

The second layer 8 is on the other hand made of an adsorbent material 8a, for example active carbon based, to eliminate by adsorption the substances that are harmful for health, in particular the COVs/SOVs. In other words, the adsorbent material 8a of which the second layer 8 is made has high adsorption and affinity characteristics in relation to the COVs/SOVs that are specific and present in the treatment of the plastics (resins).

In particular, the adsorbent material 8a, can have active carbons in loose form (FIGS. 2-5, and 10), for example granular form, or in the form of extruded elements 10 (FIGS. 6, 8-9, and 11).

In this last case, i.e., adsorbent material 8a having active carbons in the form of extruded elements 10, it is possible to form the second layer 8 by composing together, in a modular manner, a plurality of extruded elements 10, for example by gluing, this enabling the configuration flexibility of the constructional geometry of the second layer 8 to be increased.

Figure 7:
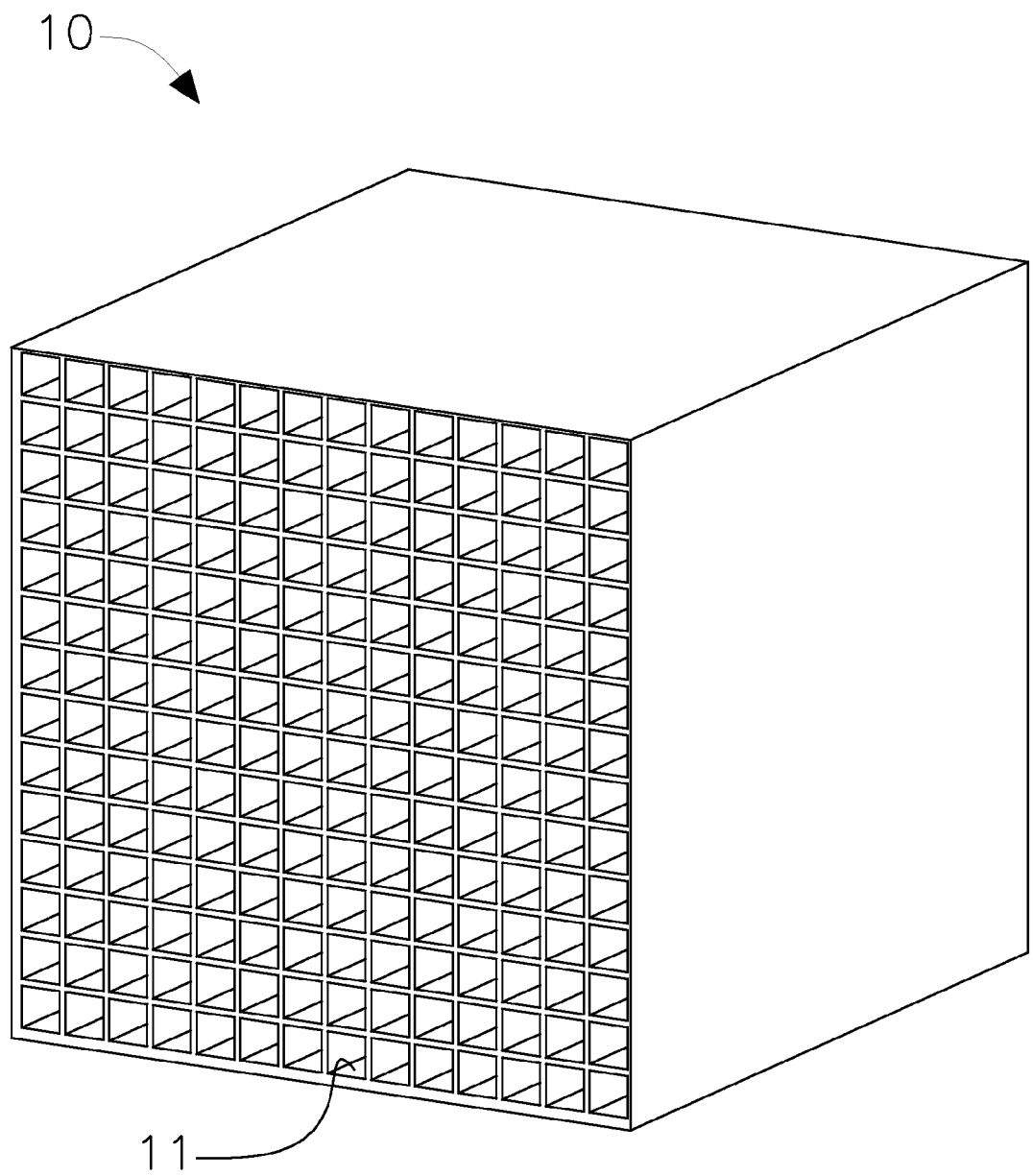
FIG. 7 is a schematic axonometric view of an extruded element included in the purifying device of FIG. 6.
Figure 9:
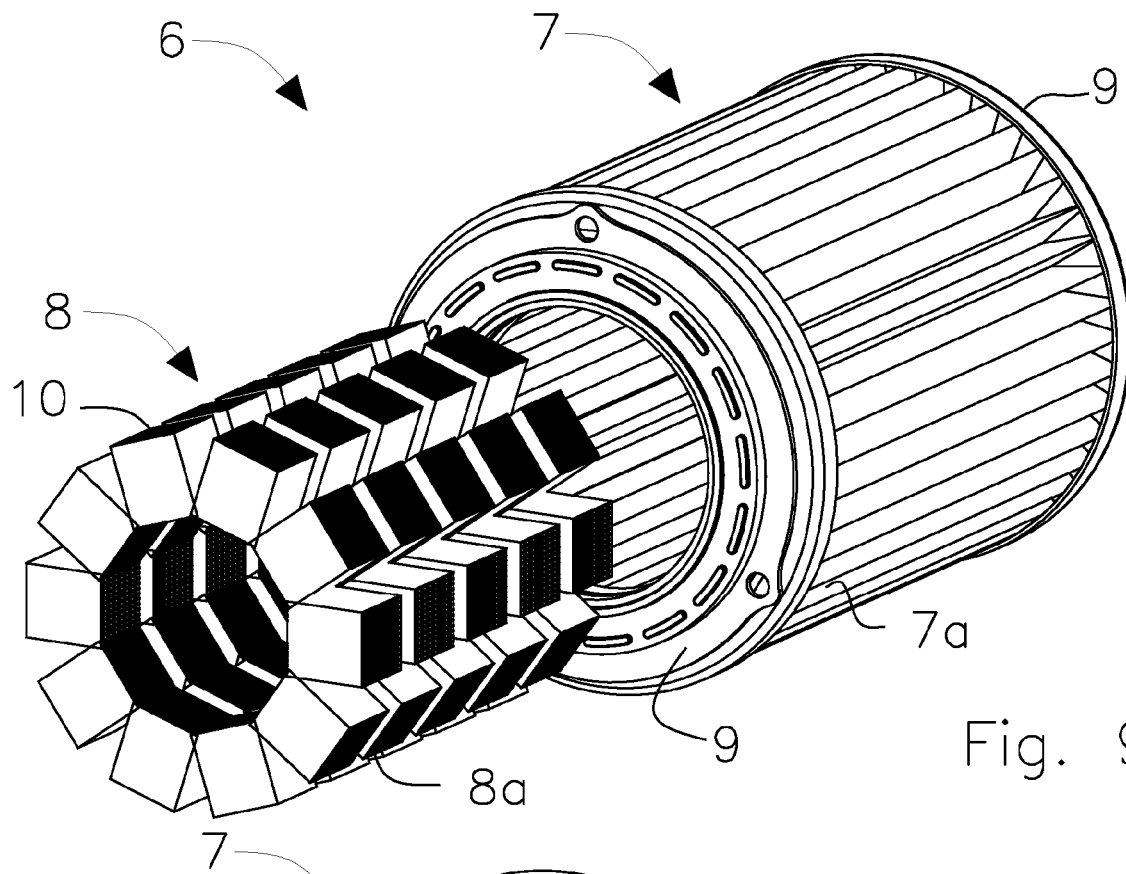
FIG. 9 is a view like that of FIG. 5 of the purifying device of FIG. 8.
Figure 8:
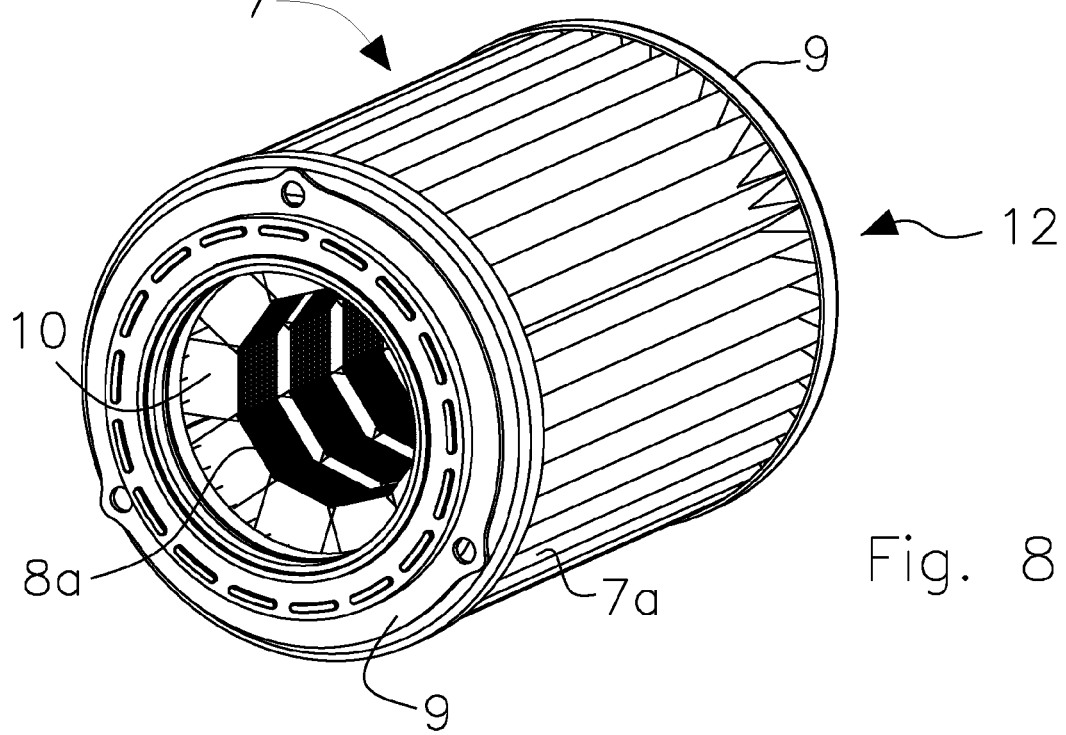
FIG. 8 is a view like that of FIG. 4 of the purifying device of FIG. 1 in the second configuration.

An example of an extruded element 10 is shown in FIG. 7. In this embodiment, the extruded element 10 has a cube or parallelpipedon or similar shape, in which through channels 11 are obtained, for example square section through channels 11, which channel the process fluid flow from an outer zone of the purifying device 6 to an inner zone of the purifying device 6 with respect to the advancement direction of the flow of the process fluid. This conformation enables the following advantages to be obtained:

significantly reducing load loss with respect to the granular form;

increasing the contact surface of the adsorbent material 8a, in terms of dimensions and surface roughness, to improve adsorption;

possibility of characterizing, i.e., defining, the percentage of active carbon in the matrix of the element 10.

In one embodiment that is not illustrated the second layer 8 consists of at least two adsorbent materials, arranged radially in relation to one another, i.e., the one further inside the purifying device 6 than the other with respect to the advancement direction of the flow of the process fluid, each of which specialized in adsorbing a particular COV/SOV. In this embodiment, for example, the adsorbent materials are configured for adsorbing, respectively, benzene and limonene.

Also, the purifying device 6 comprises, as illustrated in FIG. 1, at least one saturation sensor 13, i.e., if the second layer 8 consists of at least two adsorbent materials, one saturation sensor 13 for each of the adsorbent materials included in the purifying device 6, positioned downstream, with reference to advancement direction of the flow of the process fluid with respect to the body 12 of the purifying device 6.

In particular, each saturation sensor 13 is positioned at a conduit 13a that connects the purifying device 6 and the process fluid generator 2 and is configured for detecting a degree of saturation of the (respective) adsorbent material and reporting to a control and management unit, which is not shown, of the dehumidifying plant 1, when an adsorbent material is saturated and has to be replaced.

Also, in one embodiment of the invention, the purifying device 6 comprises a vacuum sensor 14, positioned astride the body 12, configured for detecting a pressure difference of the process fluid flow between an entry point to the purifying device 6 and an outlet point from the purifying device 6. Depending on the detected pressure difference, the vacuum sensor 14 can report to the management unit of the dehumidifying plant 1 whether the purifying device 6 is clogged and/or damaged.

Also, in another embodiment of the invention, which is not shown, the purifying device has a substantially flat shape, for example like a parallelpipedon with a rectangular or square base. In this embodiment, in use, the process fluid flow traverses substantially perpendicularly the faces of greater extent of the body of the purifying device so as to first pass through the first layer and then the second layer.

An advantage of the purifying device 6 disclosed above is that it has overall dimensions that are compatible with the filtering devices that are today present in dehumidifying plants for plastics, this making the purifying device 6 retrofittable also in is existing dehumidifying plants.

Also, the possibility of being able to provide different adsorbent materials in order to each have greater adsorption affinity in relation to a given COV/SOV, enables the purification efficiency of the purifying device 6 to be improved in function of the COV/SOV to be reduced.

It should be noted that purification efficiency is particularly noted in the extrusion industry where there may be greater need to obtain an odourless granule made of plastics compared with the non-contamination needs of the food industry.

Still another object of the invention is the ease of ordinary and/or extraordinary maintenance that enables action to be taken promptly without the need for plant shutdowns.

A further advantage of the invention is the ability to detect, by the saturation sensor/s 13 and/or vacuum sensor 15, when the purifying device 6 has to be maintained or replaced. Until today in fact, filtering devices have been replaced on the basis of the time of use in function of presumed deterioration of the device and not on the basis of the actual loss of efficiency of the device. Nevertheless, in the case of treatment of plastics there is no certainty of the quantities of/COV/SOV powder released by the plastics because this quantity is conditioned by many factors such as, amongst others: method of production, for example injection, extrusion, etc, resin percentage composition, between recycled and/or virgin resin, used in the production of plastic granules, dehumidifying treatment temperature, initial humidity present in the plastic granules, pressure present in the dehumidifying hopper, presence of condensing exchangers in the closed circuit of the dehumidifying plant 1, etc.

The thus conceived invention is capable of numerous modifications and variations, all falling within the protective scope of the inventive concept. Further, all the details can be replaced by technically equivalent elements.

The invention claimed is:

1. A device for purifying a process fluid that flows in a dehumidifying plant for dehumidifying plastics in granular and/or microgranular and/or powder and/or flake or similar form intended to supply one or more user machines and subsequently injection and/or blow and/or compression moulding, such plastics, wherein the device comprises:
    a first layer configured for filtering said process fluid,
    a second layer configured for reducing, by adsorption, substances that are harmful for health, which are present in said process fluid,
    wherein said second layer is made of at least one absorbent material having absorption and affinity features in relation to said substances that are harmful for health, wherein said at least one absorbent material consists of active carbons in the form of an extruded element,
    wherein said second layer is formed by a plurality of extruded elements, each extruded element having a cube or parallelpipedon shape, that are composable in a modular manner and each extruded element comprising through channels, said through channels being configured for channeling a flow of process fluid from an outer zone of the device to an inner zone of the device with respect to an advancement direction of said flow of process fluid.

2. The device according to claim 1, wherein the device is configured in such a manner that a flow of process fluid to be purified enters the device radially and exits axially, purified, from the device.

3. The device according to claim 2, wherein the device has a symmetric axial shape, with a dimension that is predominant with respect to the others.

4. The device according to claim 2, wherein said first layer and said second layer are parts of a body of the device, said first layer being positioned more externally with respect to said second layer with respect to an advancement direction of said flow of process fluid.

5. The device according to claim 2, wherein said first layer is made of a filtering material configured for retaining solid particles having dimensions greater than a porosity thereof.

6. The device according to claim 1, wherein the device has a symmetric axial shape, with a dimension that is predominant with respect to the others.

7. The device according to claim 6, wherein the device has a cylindrical shape.

8. The device according to claim 1, wherein said first layer and said second layer are parts of a body of the device, said first layer being positioned more externally with respect to said second layer with respect to an advancement direction of said flow of process fluid.

9. The device according to claim 8, wherein said body includes a seal arrangement configured for reducing losses of the purification capacity of the device.

10. The device according to claim 1, wherein said first layer is made of a filtering material configured for retaining solid particles having dimensions greater than a porosity thereof.

11. The device according to claim 10, wherein said first layer is made of paper and/or polyester and/or microfibres.

12. The device according to claim 1, wherein said through channels have a square section.

13. The device according to claim 12, wherein said second layer is made of at least two adsorbent materials, arranged radially in relation to one another, i.e. the one is further inside the device than the other with respect to an advancement direction of said flow of process fluid, each of said at least two adsorbent materials being specialized in adsorbing a particular harmful substance, respectively, benzene and limonene.

14. The device according to claim 1, including a saturation sensor for each adsorbent material, each saturation sensor being positioned downstream, with reference to an advancement direction of said flow of process fluid, with respect to said body of the device, and being configured for detecting a degree of saturation of an adsorbent material and reporting to a control and management unit of said dehumidifying plant, when an adsorbent material is saturated and has to be replaced.

15. The device according to claim 1, and comprising a vacuum sensor, positioned astride said body of the device, and configured for detecting a pressure difference of said flow of process fluid between an entry point to the device and an outlet point from the device so as to report to a control and management unit of said dehumidifying plant, in function of a pressure difference detected between said inlet point and said outlet point, if the device is clogged and/or damaged.

* * * * *